United States Patent [19]
Arai et al.

[11] Patent Number: 5,642,400
[45] Date of Patent: Jun. 24, 1997

[54] COMMUNICATION APPARATUS USED FOR COMMUNICATING IN ACCORDANCE WITH A MULTI-CHANNEL ACCESS METHOD

[75] Inventors: Shunji Arai, Yokohama; Mitsuhiro Watanabe, Ebina; Masashi Hamada, Tokyo, all of Japan

[73] Assignee: Canon Kabushiki Kaisha, Tokyo, Japan

[21] Appl. No.: 261,602

[22] Filed: Jun. 17, 1994

[30] Foreign Application Priority Data

| Jun. 29, 1993 | [JP] | Japan | 5-185562 |
| Nov. 18, 1993 | [JP] | Japan | 5-312736 |
| Dec. 17, 1993 | [JP] | Japan | 5-317772 |
| Jan. 27, 1994 | [JP] | Japan | 6-007625 |

[51] Int. Cl.$^6$ ............................................. H04Q 7/38
[52] U.S. Cl. ............................................. 379/58; 455/34.2
[58] Field of Search ................. 379/58, 61; 455/34.1, 455/34.2, 62, 63

[56] References Cited

U.S. PATENT DOCUMENTS

| 4,597,104 | 6/1986 | Ohki et al. | 455/62 |
| 4,837,802 | 6/1989 | Higashiyama | 455/34.1 |
| 4,965,849 | 10/1990 | Konihiro | 455/63 |
| 5,157,709 | 10/1992 | Ohteru | 455/63 |
| 5,197,093 | 3/1993 | Knuth et al. | 455/34.1 |

*Primary Examiner*—Dwayne D. Bost
*Attorney, Agent, or Firm*—Morgan & Finnegan, L.L.P.

[57] ABSTRACT

A communication apparatus to which communication units for communicating in accordance with a multichannel access method are connected comprises a receiver to receive ID information of a communication channel to be used from the plurality of communication units, and a selector to select the communication channel in accordance with the ID information received by the receiver. Namely, the selector selects the communication channel other than the communication channel such as to exert an influence on a control channel or other communication channels if it is used together with the in-use communication channel. Or, now assuming that a frequency of the in-use communication channel is set to $f_A$, the selector selects the communication channel other than the communication channel of a frequency $f_B$ such that $(2f_A - f_B)$ or $(2f_B - f_A)$ is equal to the frequency of the control channel or the frequency of the other communication channel.

28 Claims, 16 Drawing Sheets

FIG.11

| CL1 (fA) | CL2 (fB) |
|---|---|
| 24 ch | 2 ch |
| 25 ch | 4 ch |
| 26 ch | 6 ch |
| 27 ch | 8 ch |
| 28 ch | 10 ch |
| ⋮ | ⋮ |

COMMUNICATION APPARATUS USED FOR COMMUNICATING IN ACCORDANCE WITH A MULTI-CHANNEL ACCESS METHOD

BACKGROUND OF THE INVENTION

1. Field of the Invention

The present invention relates to a communication apparatus using a multichannel access method.

2. Related Background Art

Hitherto, according to a communication apparatus using a multichannel access method such as a cordless telephone or the like, which speech communication channel is used is decided by searching a free channel when a call is generated or received.

In the conventional apparatus, however, a noise may occur in an intermodulation frequency or a carrier may be erroneously detected on the basis of the existing signal.

Conventionally, in a cordless telephone system comprising a main apparatus which encloses a plurality of extension lines and outside lines and has an exchanging function and cordless telephones connected to the extension lines, such as a speech communication channel which is used by the cordless telephone, a channel which is not used by a master side or a slave side of the cordless telephone is searched for and the searched for and found channel is allocated to be used.

In the conventional apparatus, however, in the case where a plurality of cordless telephones are connected to the main apparatus. Since each pair of the master and slave independently searches a free channel and uses it, there is a time that when the speech communication channel which is used by a plurality of cordless telephones makes a control channel unusable by a radio wave interference. A speech communication channel which is used by another cordless telephone in the system is sensed and it is erroneously judged that the line is busy.

Hitherto, a communication apparatus of the multichannel access method having a control channel, such as a small power cordless telephone or the like, copes with the above problems mainly by a retransmission of the control signal as a countermeasure for collision of the signals on the control channel.

In the conventional apparatus, however, since the countermeasure for collision of the control signals depends on only the retransmission of the control signal, when the retransmission timing coincides with the timing of the control signal, the retransmission control signal also collides.

SUMMARY OF THE INVENTION

It is an object of the present invention to provide a communication apparatus of a multichannel method which can rapidly select a proper communication channel.

It is another object of the invention to prevent an influence which is exerted on a control channel by simultaneously generating a signal to a plurality of communication channels.

Still another object of the invention is to prevent that influence exerted on another communication channel by simultaneously generating a signal to a plurality of communication channels.

Further, another object of the invention is to provide a communication apparatus of a multichannel method which can prevent that influence exerted on a control channel by an intermodulation.

Further, another object of the invention is to provide a communication apparatus of a multichannel method which can prevent that influence exerted on the other communication channels by an intermodulation.

Further, another object of the invention is to provide a communication apparatus of a multichannel access method which can prevent a communication by a control channel not being executed due to noises of a specific frequency.

Further another object of the invention is to provide a communication apparatus of a multichannel method which can prevent a collision of signals on a control channel.

The above and other objects and features of the present invention will become apparent from the following detailed description and the appended claims with reference to the accompanying drawings.

BRIEF DESCRIPTION OF THE DRAWINGS

FIG. 11 is a diagram of a table showing examples of combinations of frequencies which cause a third harmonic due to an intermodulation;

DETAILED DESCRIPTION OF THE PREFERRED EMBODIMENTS

Figure 1:
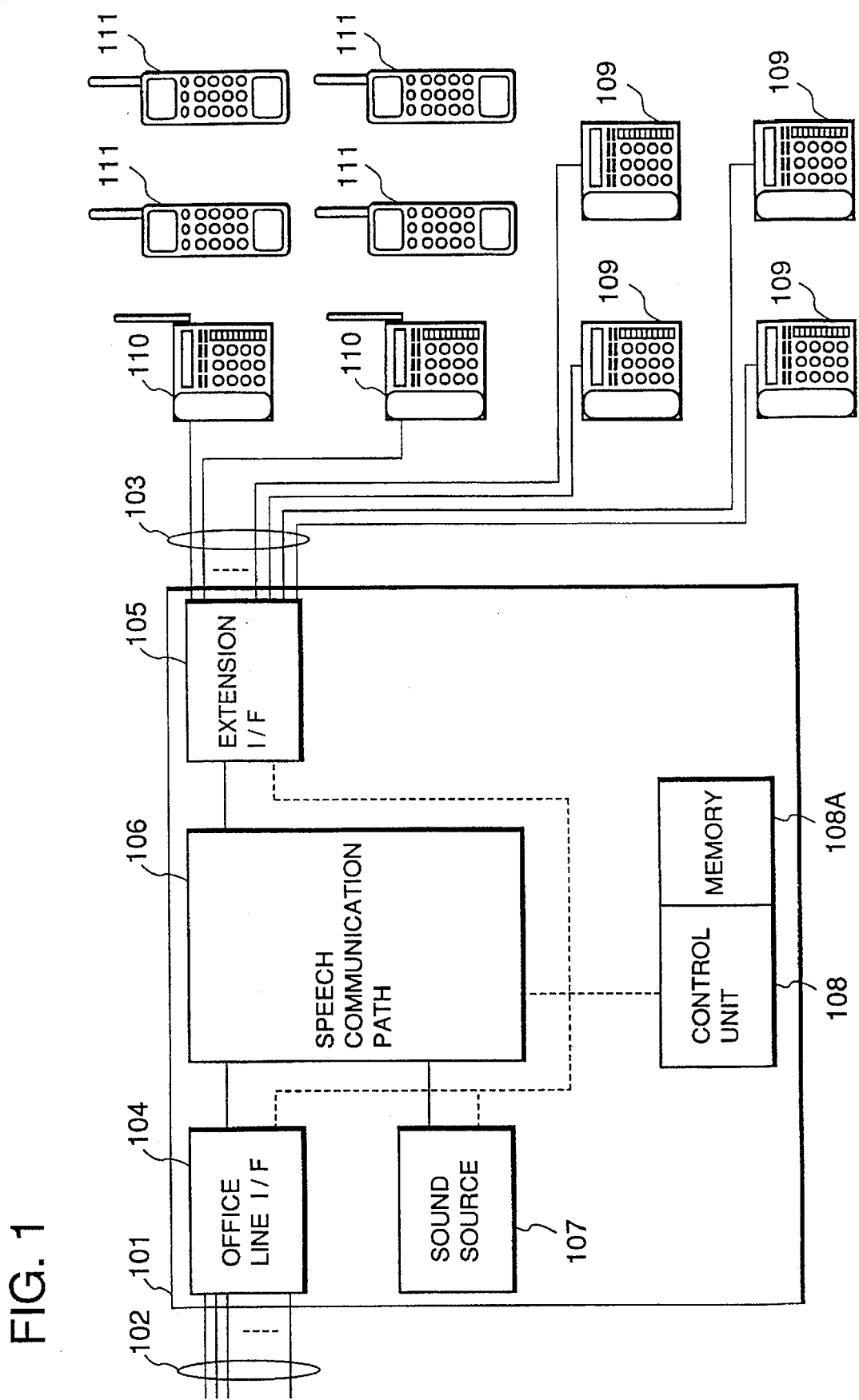
FIG. 1 is a block diagram showing a system construction of an embodiment of the invention.

FIG. 1 is a block diagram showing a cordless telephone system in the first embodiment of the invention.

A telephone exchange 101 encloses a plurality of outside lines 102 and a plurality of extension lines 103 and has an exchanging function. The outside lines 102 are lines such as a private branch exchange (PBX) extension line, a general subscriber's line, and the like. A cordless extension telephone and an extension telephone 109 are connected to the extension lines 103.

The cordless extension telephone comprises a master (fixed telephone) 110 connected to the telephone exchange 101 and a slave (moving telephone) 111 which is connected to the master 110 by a radio.

The telephone exchange 101 comprises: an office line interface 104 which encloses the outside lines 102 such as a PBX extension line, a general subscriber's line, and/or the like; an extension interface 105 which encloses the master 110 of the cordless extension and the extension telephone 109; a speech communication path 106; a call sound source 107; and a control unit 108 to control the speech communication path 106 or the like.

Figure 2:
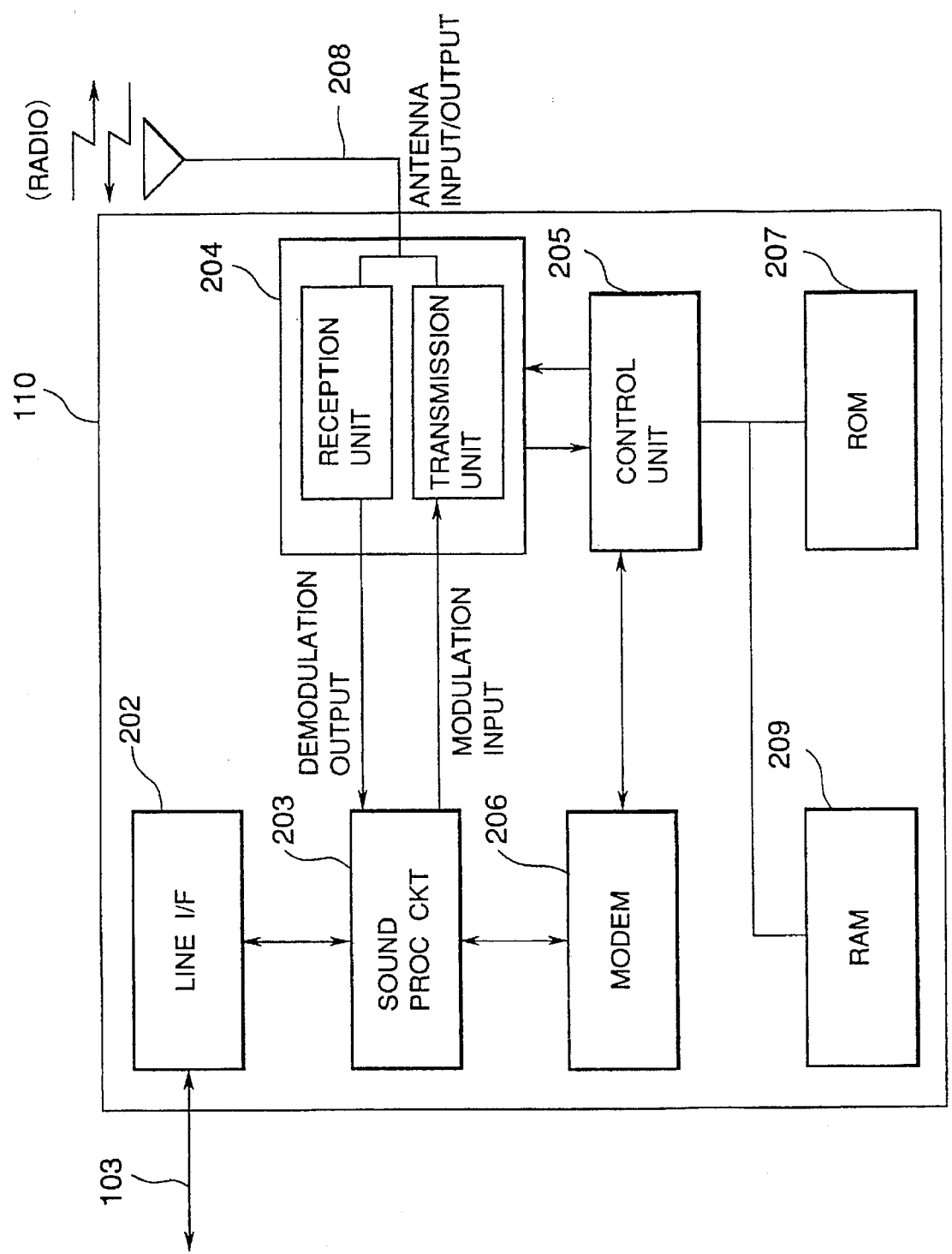
FIG. 2 is a block diagram showing a master telephone in the embodiment.

FIG. 2 is a block diagram showing a construction of the master 110 of the first embodiment.

In the master 110, a line interface 202 encloses the extension line 103 from the telephone exchange 101. The line interface 202 is connected to a transmission/reception unit 204 through a sound processing circuit 203.

A control unit 205 controls the line interface 202, sound processing circuit 203, and transmission/reception unit 204.

The transmission/reception unit 204 has a carrier sense function.

Radio control data is inputted and outputted between the sound processing circuit 203 and the control unit 205 through a modem 206. An identification number (ID) indicative of the master is stored in an ROM 207 and is read by the control unit 205. An antenna 208 transmits and receives a radio signal.

Figure 3:
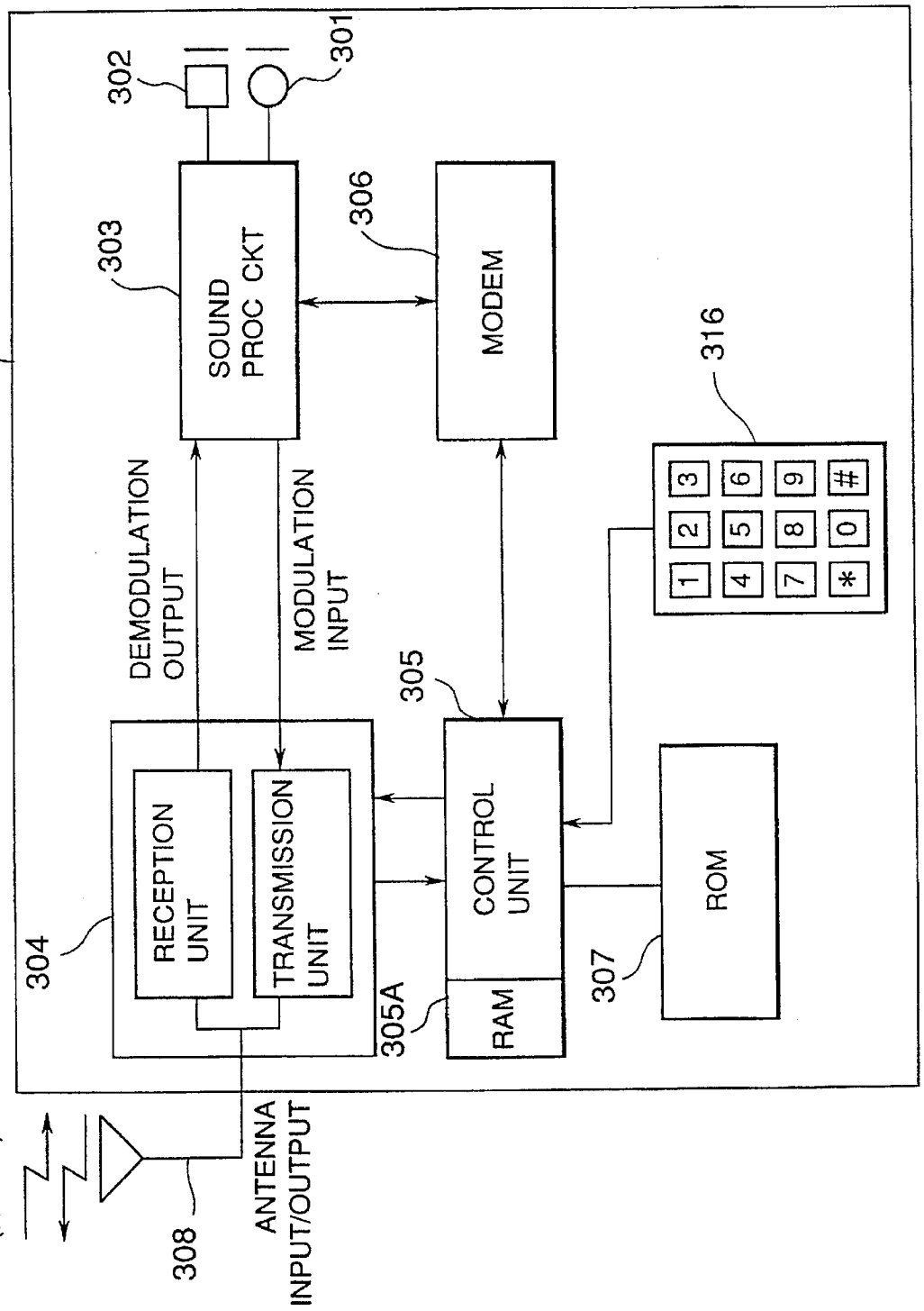
FIG. 3 is a block diagram showing a slave telephone in the embodiment.

FIG. 3 is a block diagram showing a construction of the slave 111 of the embodiment.

A transmitter 301 and a receiver 302 are connected to a transmission/reception unit 304 through a sound processing circuit 303.

The sound processing circuit 303 and transmission/reception unit 304 are controlled by a control unit 305. Information from a key pad 316 is inputted to the control unit 305.

The radio control data is inputted and outputted between the sound processing circuit 303 and the control unit 305 through a modem 306. An identification number (ID) indicative of the moving telephone has been stored in an ROM 307 and is read by the control unit 305. An antenna 308 transmits and receives a radio signal.

The control in the control unit 108 of the telephone exchange 101 will be first explained with reference to FIG. 4. The control unit 108 executes a communication with the cordless telephone masters 110 and accepts various kinds of events. When an occupied channel notification or an occupied new release notification is received from the cordless telephone master (S301 and S303), the occupied channel notification or the occupied channel release notification is transmitted to all of the cordless telephone masters except the cordless telephone master which received the event (S302 and S304).

Figure 5:
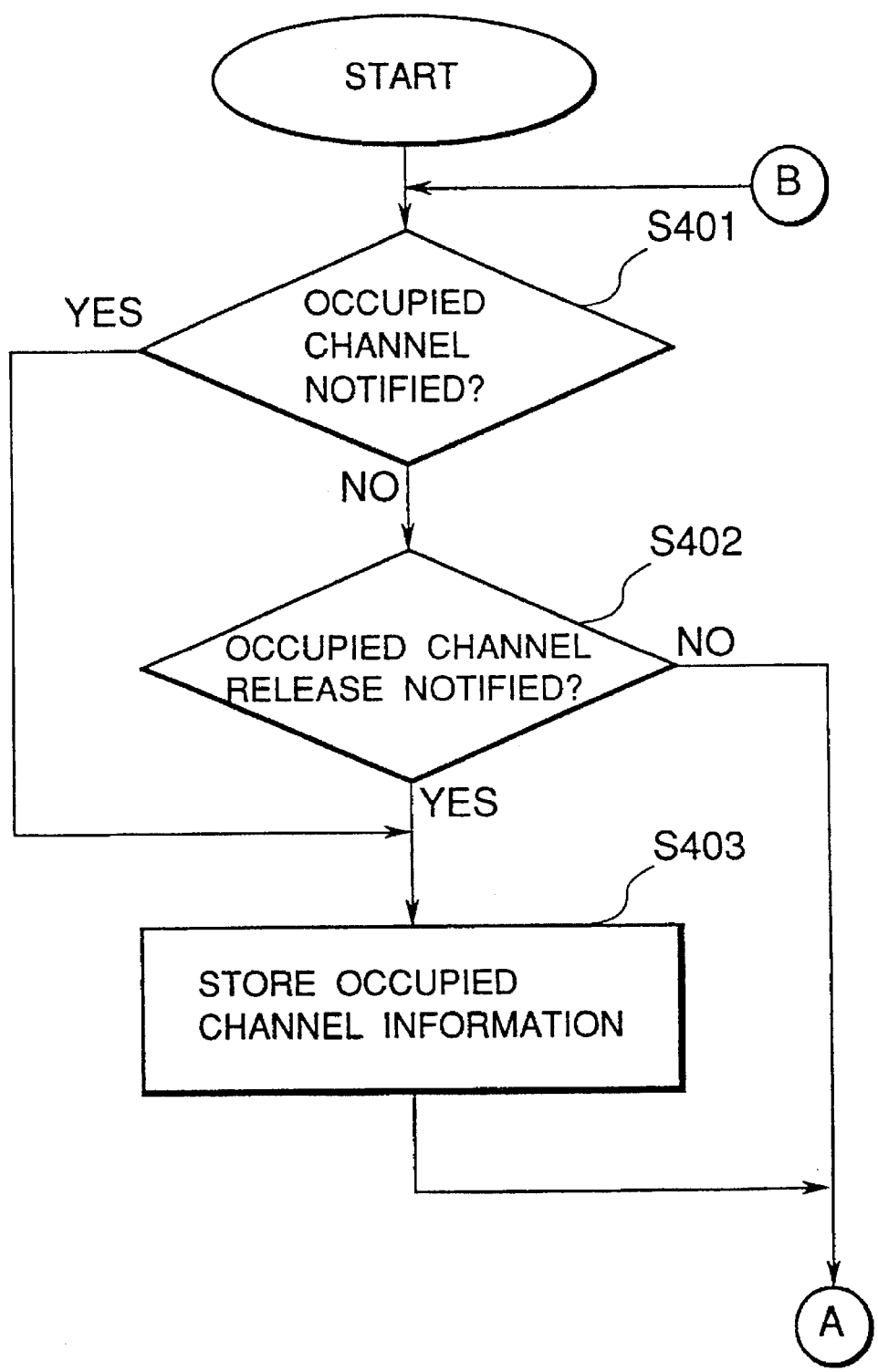
FIG. 5 is a flowchart showing a control in a stand-by mode of the control unit of the first cordless telephone master which embodies the invention.
Figure 6:
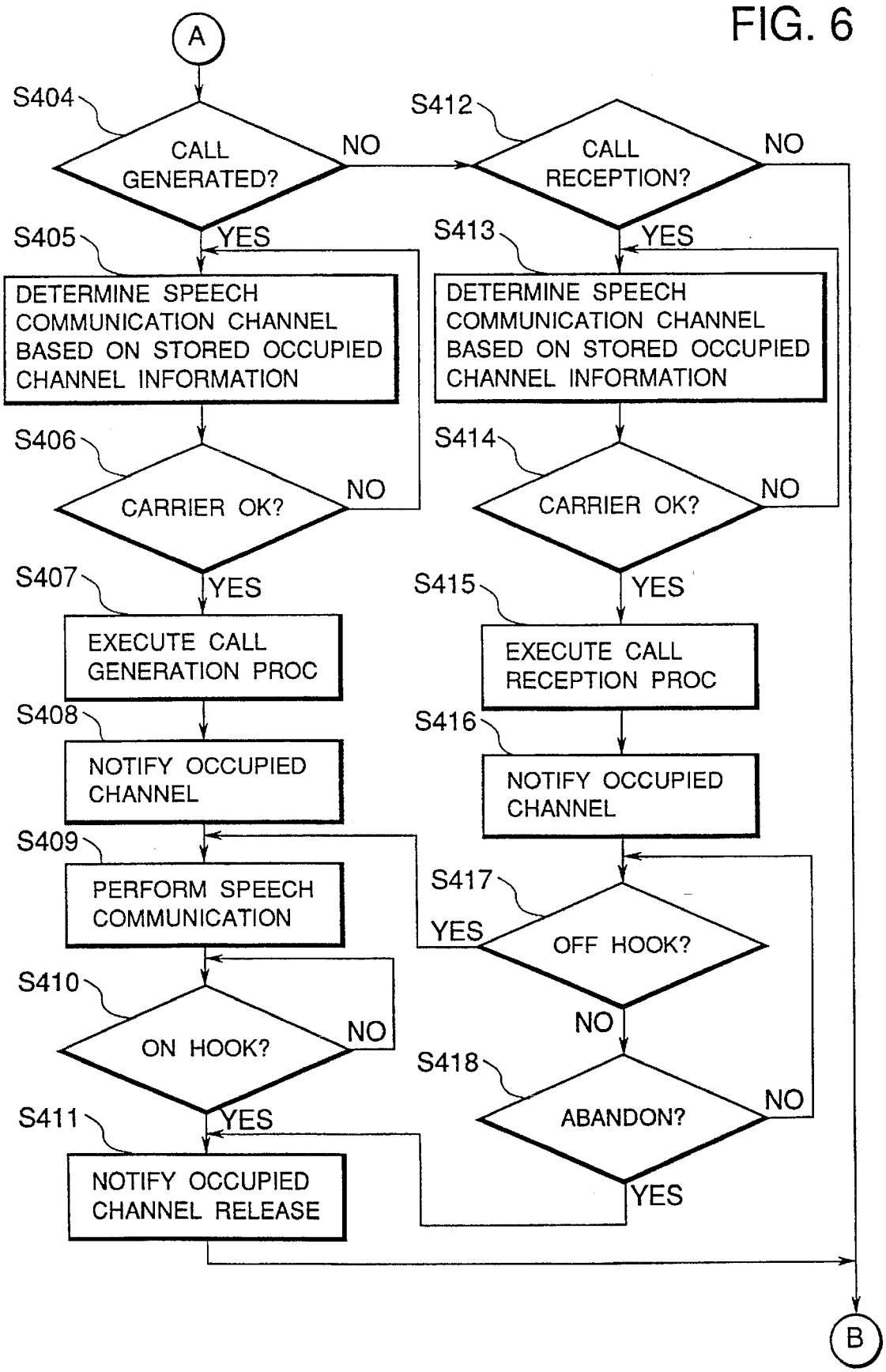
FIG. 6 is a flowchart showing a control at the time of call generation or reception of the control unit of the first cordless telephone master which embodies the invention.

Subsequently, in FIGS. 5 and 6, the control in the control unit 205 of the cordless telephone master 110 will be explained. When the occupied channel notification or the occupied channel release notification transmitted from the telephone exchange 101 in steps S302 and S304 is received (S401, S402), the control unit 205 stores the information into an RAM 209 (S403).

When the control unit 205 receives a call generation from a cordless telephone slave (S404), a speech communication channel is determined so as to not choose the same channel based on the occupied channel information of the other cordless telephone which has been stored in the RAM 209 in step S403. A carrier is sensed and if it is not "OK" (S406), the speech communication channel is similarly determined again in S405.

If the carrier is OK in S406, a call generation process is executed (S407) and a communication of the speech communication channel with the slave is established. Further the occupied channel notification is transmitted to the telephone exchange 101 (S408) and speech communication is started (S409). When the speech communication is finished and the slave is on hooked (S410), the speech communication channel is released and, simultaneously, the occupied channel release notification is transmitted to the telephone exchange 101 (S411) and the telephone exchange 101 is returned to an idling state. At the call reception, similar operations are also executed in steps S412, S413, S414, S415, and S416. When the slave is off hooked (S417) in a state in which the communication of the speech communication channel with the slave is established and the slave is rung in step S415, a speech communication state is obtained (S409). On the other hand, when abandonment of call reception is received from the telephone exchange 101 (S418), an occupied channel release notification is transmitted to the telephone exchange 101 at the same time when the speech communication channel is released (S411), and the telephone exchange is returned to the idling state.

In the above embodiment, a speech communication channel is decided simply so as to not choose the same channel as the speech communication channel which is used by another cordless telephone. The speech communication channel can be also determined in accordance with a special rule (for example, when I and J channels are used, I+J will be set to the next channel).

Or, the channels can also be uniformly distributed in the whole region of the speech communication channel.

Figure 4:
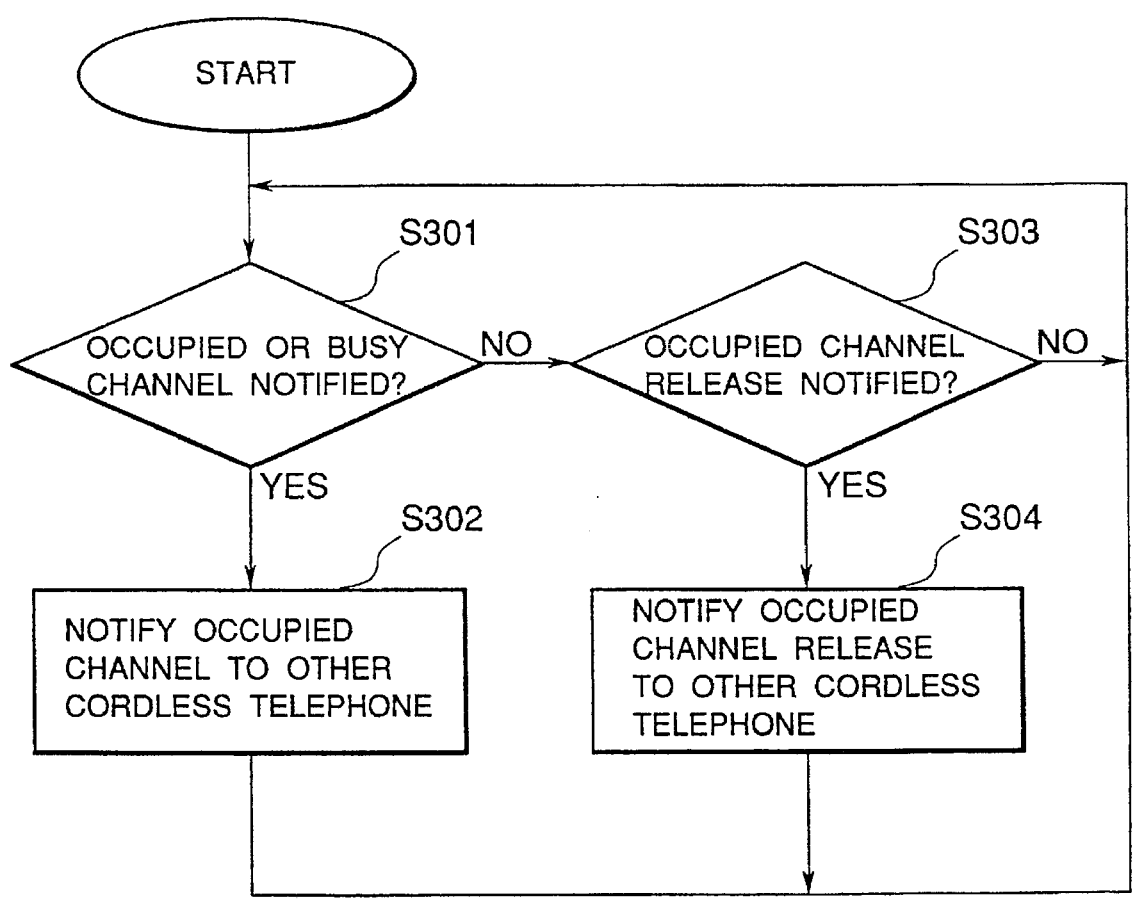
FIG. 4 is a flowchart showing a control of a control unit of a first telephone exchange which embodies the invention.

In steps S302 and S304, it is also possible to construct a system in a manner such that the cordless telephone which notified all of the cordless telephones in steps S302 and S304 in FIG. 4 and transmitted the notifications in steps S301 and S303 ignores the notifications in steps S302 and S304.

As mentioned above, according to the embodiment, since the notification to the occupied channel and to the master of its release is executed during the standby state before the call generation or call reception occurs, in the case where the call generation or call reception occurs, the sensing of excessive carrier is prevented and the speech communication channel can be rapidly determined.

Figure 7:
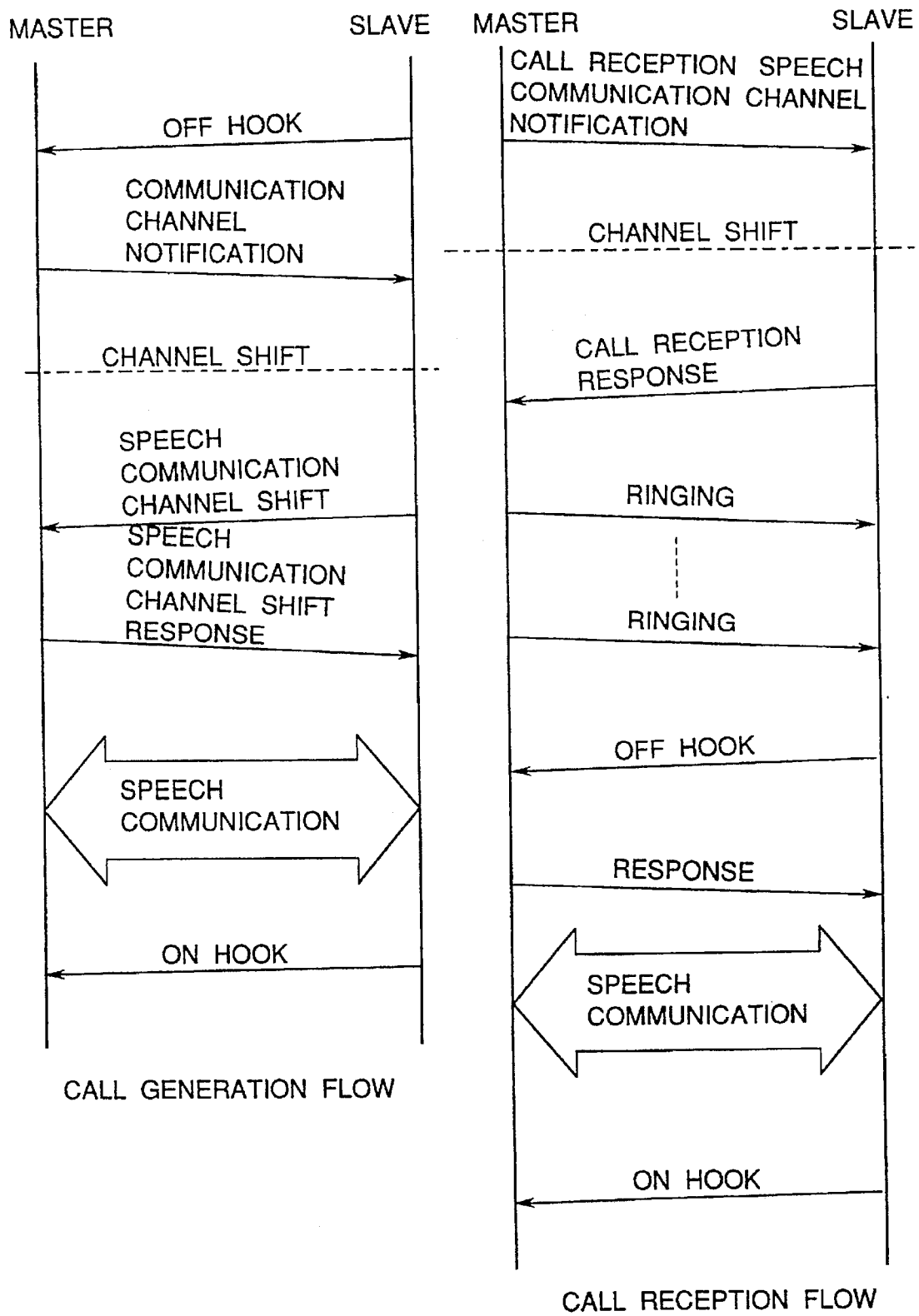
FIG. 7 is a flowchart showing a flow of a control signal of the cordless telephone at the time of call generation and call reception.

FIG. 7 shows a flow of control signals between the master and the slave of the cordless telephone. The master decides the speech communication channel after the off hook signal was received from the slave at the time of call generation. At the time of call reception, the master determines the speech communication channel after the call reception signal from the line was detected, and the speech communication channel notification is transmitted to the slave.

Figure 8:
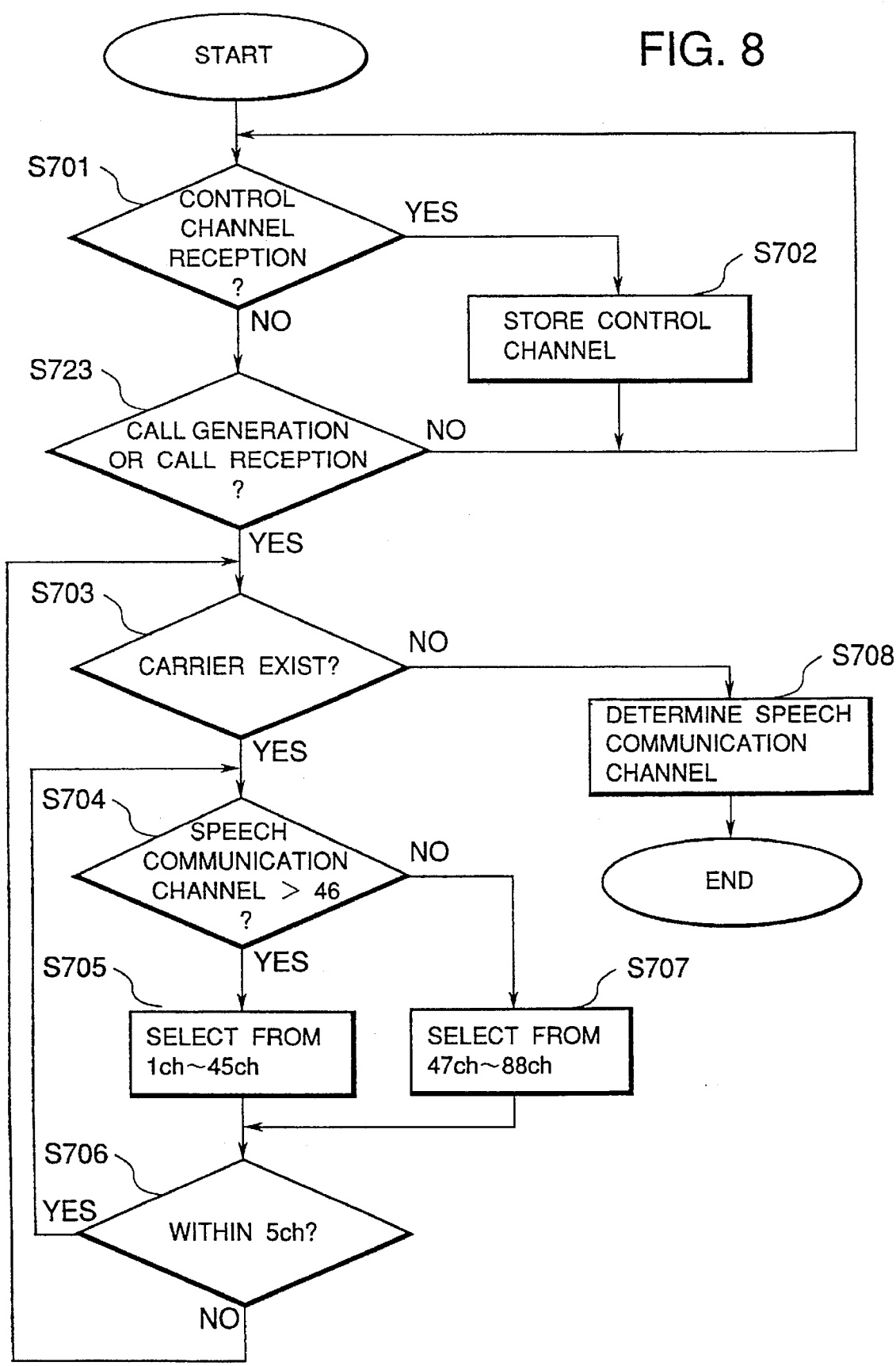
FIG. 8 is a flowchart showing a control of the control unit of a cordless telephone connected to a second telephone exchange which embodies the invention.

The second embodiment of the invention will now be explained with reference to FIG. 8. A hardware construction of the embodiment is substantially the same as that of the first embodiment in FIGS. 1 to 3.

In telephone exchange 101, a control channel is set by a key operation from the extension telephone 109. That is, in the extension telephone 109, when the keys are depressed in accordance with the order of (hook)→(*)→(0)→(#)→ (hold), 46 channels are set. When the keys are depressed in accordance with the order of (hook)→(*)→(1)→(#)→ (hold), 89 channels are set. When a series of key operations for setting the control channel by the extension telephone 109 is recognized, the control unit 108 notifies the control channel to the master 110 of each cordless telephone. It is also possible to provide an exclusive-use set key for setting the control channel.

When the notification of the control channel from the telephone exchange 101 is received (S701), the master 110 of each cordless telephone stores the data into the RAM 209 (S702) and the notified channel is used as a subsequent control channel.

Therefore, when any one of the control channels cannot be used due to noises, the control channel of less noises can be used.

The operation for this setting can be simplified.

When the notification of the control channel is received from the telephone exchange 101, the master 110 notifies the control channel to the slave 111. The slave 111 can set the control channel by the operation of the key pad 316. The slave stores the control channel into an RAM 305A provided for the control unit 305.

The control unit 205 of the cordless telephone master 110 is used in a preceding speech communication in order to determine the speech communication channel at the time of call generation or call reception (S723) and senses the carrier of the speech communication channel stored in the RAM 209 (S703). If the carrier is not detected, the channel is selected as a speech communication channel (S708). As mentioned above, by using the speech communication channel which was used in the preceding speech communication, a speech communication channel in which noises are small and a possibility such that the channel can be used is high can be selected. When the carrier is detected (S703), the control unit 205 selects a candidate for a new speech communication channel from 1 to 45 channels when the number of speech communication channels which sensed the carrier is larger than 46 channels, or from 47 to 88 channels when it is equal to or smaller than 46 channels (S705 and S707), and stores the selected channel into the RAM 209. The control unit 205 judges whether the candidate channel is away from the preset control channel by five or more channels or not (S706), if YES, a carrier is sensed (S703). On the other hand, if NO (S706), a new candidate for the speech communication channel is selected so that the intermodulation frequency doesn't coincide with the control channel (S704, S705, and S707).

As for the speech communication channels in steps S705 and S707, a candidate for the speech communication channel is selected from the end of the channels like 1-88-6-83-11 or from the small number of channels in the lower and upper groups of the channel like 1-47-6-53-11.

As mentioned above, in the embodiment, when the carrier is detected in the speech communication channel of a high frequency, a speech communication channel of a low frequency is selected and when a carrier is detected in the speech communication channel of a low frequency, a speech communication channel of a high frequency is selected in a manner such that the speech communication channels of frequencies which are close to each other are not used at the same time among the 87 speech communication channels.

Therefore, when it is now assumed that the frequencies of high and low frequencies which are used at the same time are set to $f_A$ and $f_B$, the intermodulation frequency which is calculated by $2f_A - f_B$ can be set so as to be deviated from the frequency zone of the speech communication channels.

The invention can be also applied to a single cordless telephone. In this case, the extension line 103 in FIG. 2 is changed to the office line and the master stores the control channel in accordance with a designation from the operating unit provided for the control unit 205 in step S701.

Figure 9:
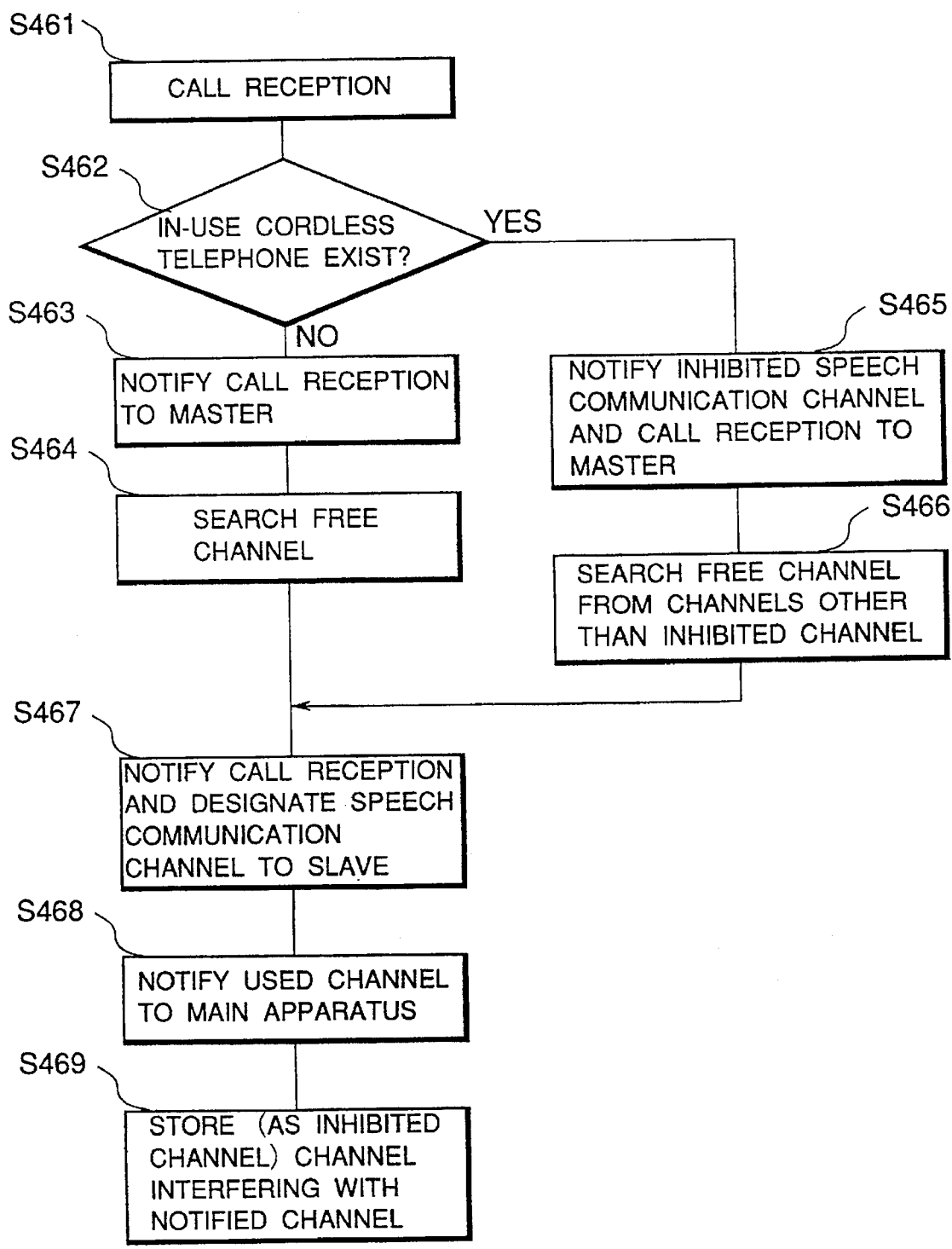
FIG. 9 is a flowchart showing the operation at the time of call reception in the third embodiment of the invention.

FIG. 9 is a flowchart showing the operation at the time of call reception in the third embodiment of the invention.

When a call is received by a cordless telephone from an outside line or an extension line which is enclosed by the telephone exchange 101 (S461), the control unit 108 of the telephone exchange 101 discriminates to see if an in-use cordless telephone (namely, a cordless telephone which is at present being used) exists at that time among the enclosed cordless telephones with reference to a memory 108A (S462).

In the case where no in-use cordless telephone exists, the telephone exchange 101 notifies the master 110 of the call reception (S463). The master 110 which received the notification senses the carrier and searches for a free channel (S464). The master 110 notifies the call reception to the slave 111 through the control channel and instructs the speech communication channel (S467).

On the other hand, in the case where the in-use cordless telephone exists, the control unit 108 calls the inhibited speech communication channel which has been stored in the memory 108A in the telephone exchange 101 and notifies the inhibited speech communication channel and the call reception to the master 110 (S465).

The control unit 205 of the master 110 which received the notification senses the carrier and searches for free channels other than the inhibited channel (S466). When the free channel is found, the call reception is notified and the speech communication channel is instructed to the slave 111 through the control channel (S467).

As mentioned above, after the speech communication channel of the master 110 and the slave 111 was established, the control unit 205 of the master 110 notifies the used speech communication channel to the telephone exchange 101 (S468). The control unit 108 of the telephone exchange 101 which received the notification stores the channel which interferes with the used channel and makes the control channel unusable as an inhibited channel into the memory 108A (S469). The channel stored in the memory 108A is deleted from the memory when the call is disconnected.

Figure 10:
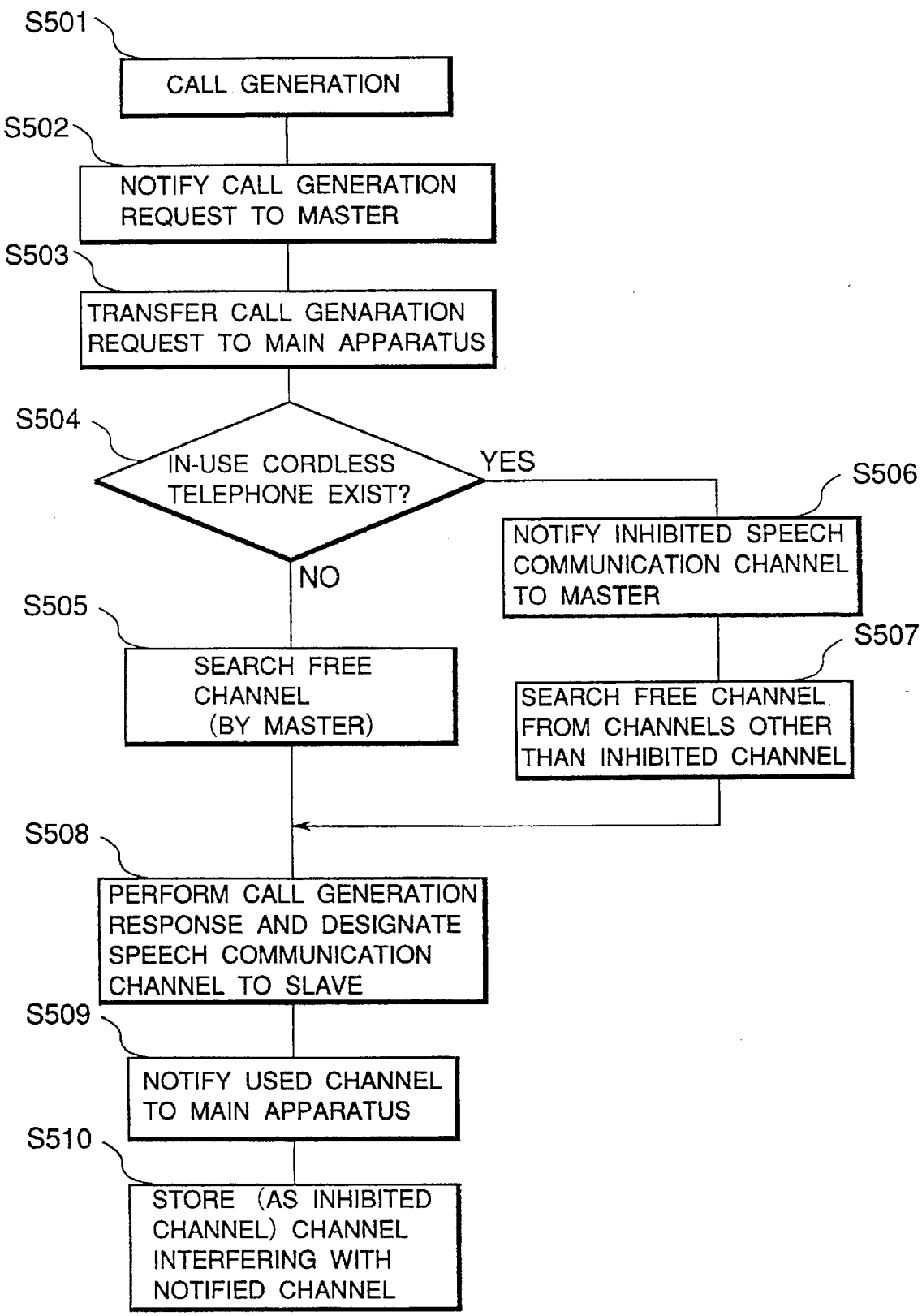
FIG. 10 is a flowchart showing the operation at the time of call generation in the third embodiment.

FIG. 10 is a flowchart showing the operation at the time of call generation in the third embodiment.

When a call is generated by the slave 111 of the cordless telephone which is enclosed in the telephone exchange 101 (S501), the slave 111 notifies the call generation request to the master 110 by using the control channel (S502).

The master 110 which received the call generation request notifies the call generation to the telephone exchange 101 (S503), the control unit 108 of the telephone exchange 101 which received the notification discriminates to see if an in-use cordless telephones exists at present among the enclosed cordless telephones (S504).

In the case where no in-use cordless telephone exists the telephone exchange 101 notifies the master 110 of the fact that there is no telephone. Due to this the master 110 senses the carrier and searches free channels (S505). The master 110 generates a call generation response signal and designates a speech communication channel to the slave 111 through the control channel (S508).

On the other hand, when the in-use cordless telephone exists, the control unit 108 calls the inhibited channel stored in the memory 108A of the telephone exchange 101 and notifies the inhibited speech communication channel to the master 110 (S506). When receiving the notification, the master 110 senses the carrier and searches free channels from channels other than the inhibited channel (S507). When a free channel is found, the master 110 generates a call generation response signal and designates the speech communication channel to the slave 111 through the control channel (S508).

As mentioned above, after the speech communication channel between the master 110 and the slave 111 is established, the master 110 notifies the used speech communication channel to the telephone exchange 101 (S509). The control unit 108 of the telephone exchange 101 which received the notification stores the channel which interferes with the used channel and makes the control channel unusable as an inhibited channel into the memory 108A (S510). The channel stored into the memory is deleted from the memory 108A when the call is disconnected.

An example of setting the inhibited channel will now be described hereinbelow.

One of the radio wave faults which a radio apparatus receives is an intermodulation. This is a phenomenon such that in the case where two radio waves of different frequencies enter a receiver, a radio wave of a frequency which is different from the frequency which entered by non-linear characteristics of a demodulation circuit is generated and the radio wave which doesn't actually enter is seen as if it entered.

What is called a third harmonic particularly causes a problem in the intermodulation. When the radio waves of the frequencies $f_A$ and $f_B$ enter, the frequency of $2f_A$-$f_B$ is generated.

The above phenomenon is applied to the cordless telephone system. In the case where two speech communication channels $f_A$ and $f_B$ are now being used, when ($2f_A$-$f_B$) corresponds to the frequency of the control channel of the cordless telephone, the other cordless telephones cannot generate a call.

In order to solve the above problem, in the embodiment, when the frequency $f_A$ is used, the channel of the frequency $f_B$ in which ($2f_A$-$f_B$) is equal to the control channel frequency is set to the inhibited channel. FIG. 11 is an explanatory diagram showing an example of the combination of $f_A$ and $f_B$ when the number of control channels is set to 46 channels. In the embodiment, the table of FIG. 11 has been stored in the memory 108A.

The fourth embodiment of the invention will now be explained hereinbelow.

The system construction in the embodiment is substantially the same as that in the first embodiment shown in FIGS. 1 to 3. The processes by the control unit 108 of the telephone exchange 101 and the control unit 205 of the master 110 are especially different. In the embodiment, the table of FIG. 11 has been stored in the RAM 209.

The control unit 108 of the telephone exchange 101 notifies the speech communication channel used by the cordless telephone which has already been used in the system to the master 110 of the cordless telephone which newly received a call or generated a call. On the other hand, the control unit 205 of the master 110 judges the speech communication channel which makes the control channel unusable from the speech communication channels which the cordless telephone in the system to be notified from the telephone exchange 101 uses. The control unit 205 controls the transmission/reception unit 204 so as to set the speech communication channels other than the judged channel.

Figure 12:
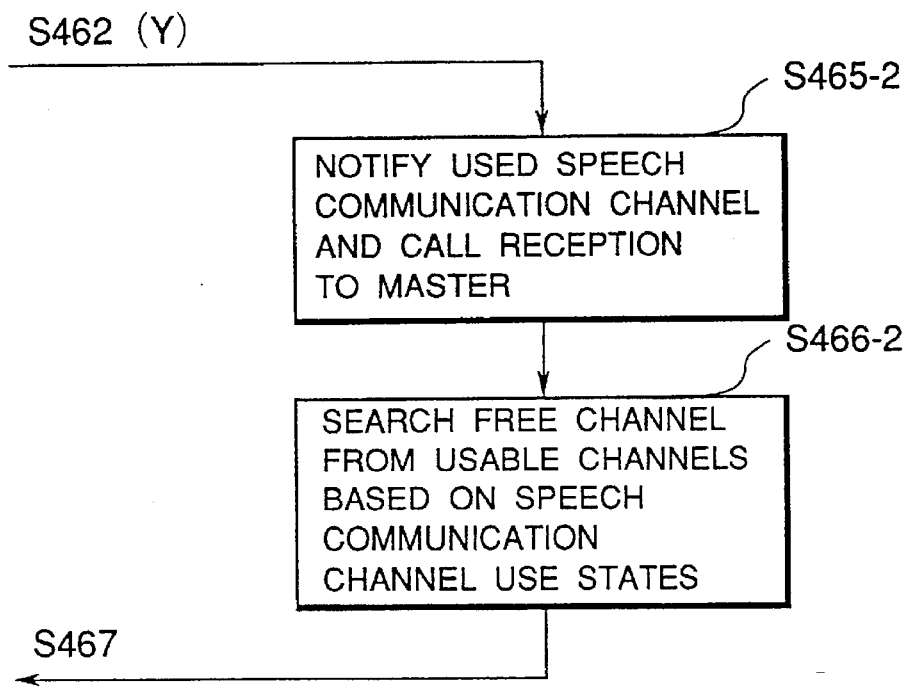
FIG. 12 is a flowchart showing a part of the operation at the time of call reception in the fourth embodiment of the invention.
Figure 13:
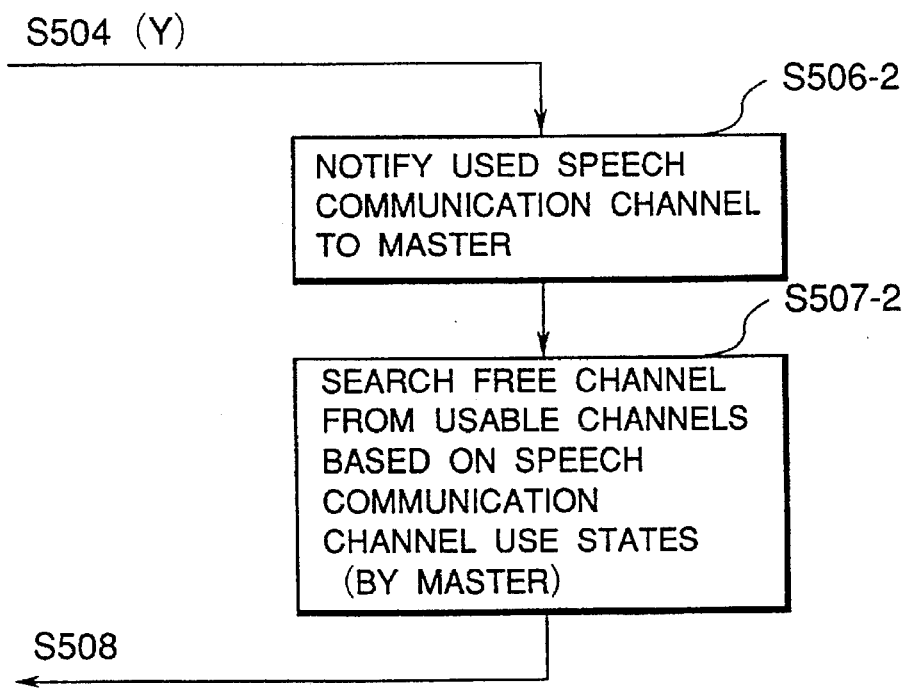
FIG. 13 is a flowchart showing a part of the operation at the time of call generation in the fourth embodiment.

At the time of call reception, above-mentioned step S465 in FIG. 9 is replaced to step S465-2 shown in FIG. 12 and step S466 is replaced to step S466-2. At the time of call generation, above-mentioned step S506 in FIG. 10 is replaced to step S506-2 in FIG. 13 and step S507 is replaced to step S507-2. That is, at the time of call reception, the control unit 108 of the telephone exchange 101 notifies the speech communication channel which is used by the cordless telephone in the system and the call reception to the master 110 (S465-2) and searches for a free channel from the usable channels by referring to the table of FIG. 11 (S466-2). At the time of call generation, similar operations are also executed. As mentioned above, the selecting process of the speech communication channel executed on the telephone exchange 101 side in the third embodiment is executed on the master 110 side in the fourth embodiment, so that a similar effect is obtained.

In each of the above embodiments, with respect to the telephone exchange 101 and the master 110, a portion which functions as a telephone exchange 101 and a portion which functions as a fixed apparatus 110 can be also enclosed in the same casing.

In the above embodiments, although the master senses the carrier after the call generation request from the slave of the cordless telephone in the system was received, the carrier sense can be executed at a predetermined period or at any time irrespective of the call generation request from the cordless telephone slave. Therefore, it is possible to prevent the control channel from becoming unusable due to a radio wave interference of the speech communication channel which is used by a plurality of cordless telephones in the same system.

Figure 14:
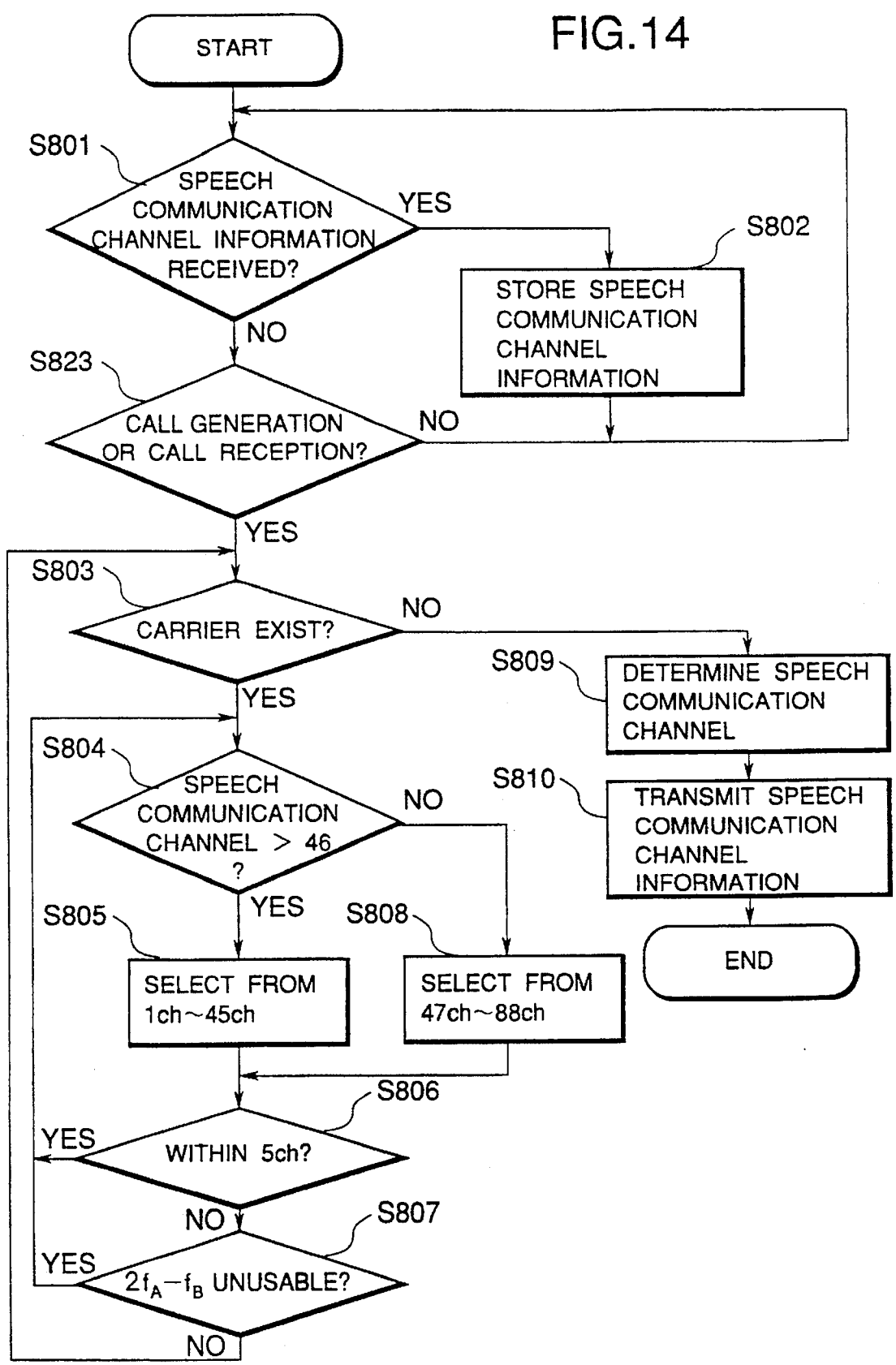
FIG. 14 is a flowchart showing a control of a modification of the control unit of the cordless telephone connected to a fifth telephone exchange to which embodies the invention.

The fifth embodiment of the invention will now be explained with reference to FIG. 14. The flowchart in FIG. 14 is a modification of the flowchart of FIG. 8. In the fifth embodiment, when the master of the control unit 205 of each cordless telephone determines the speech communication channel (S809), its information is notified to the telephone exchange 101 (S810). The control unit 108 of the telephone exchange which received the information of the speech communication channel transmits the information to the master of each cordless telephone. The control unit 205 of the cordless telephone master which received the speech communication channel information of the other cordless telephones (S801) stores the information into the RAM 209 (S802). When the speech communication is finished, the master of the other cordless telephone also similarly notifies that the speech communication channel became free through the telephone exchange.

Step S803 and subsequent steps in the flowchart of FIG. 14 relate to a procedure to determine a new speech communication channel on the basis of the information of the speech communication channel which is used by the other cordless telephones. That is, in the case where the frequency of the selected speech communication channel is set to $f_A$, either one of use frequencies of the other cordless telephones or the frequency of the control channel is set to $f_B$, the frequency which is calculated by ($2f_A$-$f_B$) or ($2f_B$-$f_A$) has already been used or in the case where such a frequency coincides with the frequency of the control channel, the speech communication channel of the frequency $f_A$ is avoided (S807). By executing as mentioned above, it is possible to prevent that the control channel cannot be used or noises occur in the speech communication which is being executed due to the intermodulation frequency.

Processes in steps S804, S805, S806, and S808 can be omitted in the embodiment.

In the modification of the embodiment, the speech communication channel in which carrier existence is detected in step S803 is also transmitted in a manner similar to step S810 and is notified to the other masters and is also used to avoid the intermodulation frequency in step S807 in a manner similar to the speech communication channel which is being used for the speech communication. By executing as mentioned above, the intermodulation frequency can be further accurately avoided.

Although an initiative to determine the speech communication channel has been given to the master here, the initiative to determine the speech communication channel can be also given to the slave. It is also possible to separately give the initiative for decision of the speech communication channel at the time of call generation and at the time of call reception.

Although the channel isn't used as a speech communication channel so long as it lies within 5 channels from the control channel, it is also possible to set the number of channels to 10 channels or the like. The channels as candidates for the speech communication channel can be also increased or decreased on a 5 channel unit basis or on a 3 channel unit basis or the like.

The present invention can be applied not only to a cordless telephone but also a radio wave data terminal.

That is, the speech communication channel in which a carrier exists is previously stored in the RAM and when the speech communication channel is newly allocated, the communication channel is selected so as to avoid the speech communication channel such that it exerts an influence on the other in-use speech communication channel if it is used together with the speech communication channel in which the carrier exists. Therefore, it is possible to prevent noises that occur in the other speech communication channels or the carrier being is erroneously detected.

As a speech communication channel which is stored since the carrier exists, it is also possible to include the speech communication channel in which the carrier was detected at the time of the search of the free channel.

In a radio communication apparatus including a plurality of masters, either one of the masters stores the in-use speech communication channel as a speech communication channel in which the carrier exists and ignores the speech communication channel in which the carrier was detected when the free channel is searched. In this manner, the free or occupied state of the speech communication channel can be rapidly judged.

In a radio communication apparatus including a plurality of masters, the speech communication channel is selected so as to avoid the speech communication channel such as to exert an influence on the speech communication channel which has already been used by either one of the masters if such a speech communication channel is used together with the speech communication channel which has been stored by regarding such that the carrier exists. Therefore, the drawbacks such that noises are given to the communication which is being executed and the carrier disconnection cannot be detected can be prevented without largely reducing the number of speech communication channels which can be selected.

In a radio communication apparatus of the multichannel access method, when the communication is started, by selecting the speech communication channel whose frequency is away from the frequency of the speech communication channel in which the carrier has already existed, or by dividing the speech communication channels into the group of a high frequency and the group of a low frequency and, when the carrier is detected in one of the speech communication channels of one of the two groups, by selecting the speech communication channel of the other group, a situation such that the intermodulation frequency coincides with the frequency of the speech communication channel and noises are generated in the speech communication channel and the carrier of the speech communication channel cannot be detected can be prevented.

Further, by selecting the speech communication channel so as to avoid the speech communication channel in which a difference between its frequency and the frequency of the control channel is equal to or less than a predetermined frequency, a situation such that the intermodulation frequency coincides with the frequency of the control channel can be also prevented.

In a radio communication apparatus having a plurality of masters, by providing setting means for setting the frequency of the control channel and notifying means for notifying the control channel set by the setting means to the plurality of masters, a communication can be certainly performed by using the proper control channel in accordance with the installing environment.

In the case where the carrier exists in the speech communication channel, by selecting the speech communication channel so as to avoid the speech communication channel such that it exerts an influence on the other speech communication channel if such a speech communication channel is used together with the speech communication channel, a situation such that noises are generated in the other speech communication channels or the carrier of the other speech communication channel is erroneously detected can be prevented.

In the case where the carrier exists in the speech communication channel of the frequency $f_A$, by selecting the speech communication channel so as to avoid the frequency $f_B$ such that the speech communication channel of the frequency of $(2f_A-f_B)$ or $(2f_B-f_A)$, a situation such that noises are given to the communication which is being executed due to the intermodulation frequency or the carrier disconnection cannot be detected can be avoided.

In a radio communication apparatus having a plurality of masters, by providing a memory to store the speech communication channels used by a plurality of masters and means for selecting the speech communication channel so as to avoid the speech communication speech channel such as to exert an influence on the other speech communication channel if such a speech communication channel is used together with either one of the used speech communication channels, a situation such that noises are given or the carrier cannot be detected can be promptly prevented.

Further, by selecting the speech communication channel so as to avoid the speech communication channel which exerts an influence on the other in-use speech communication channel, a situation such that noises are given to the communication that is being executed and the disconnection of the carrier cannot be detected can be prevented without largely reducing the number of speech communication channels which can be selected.

Figure 15:
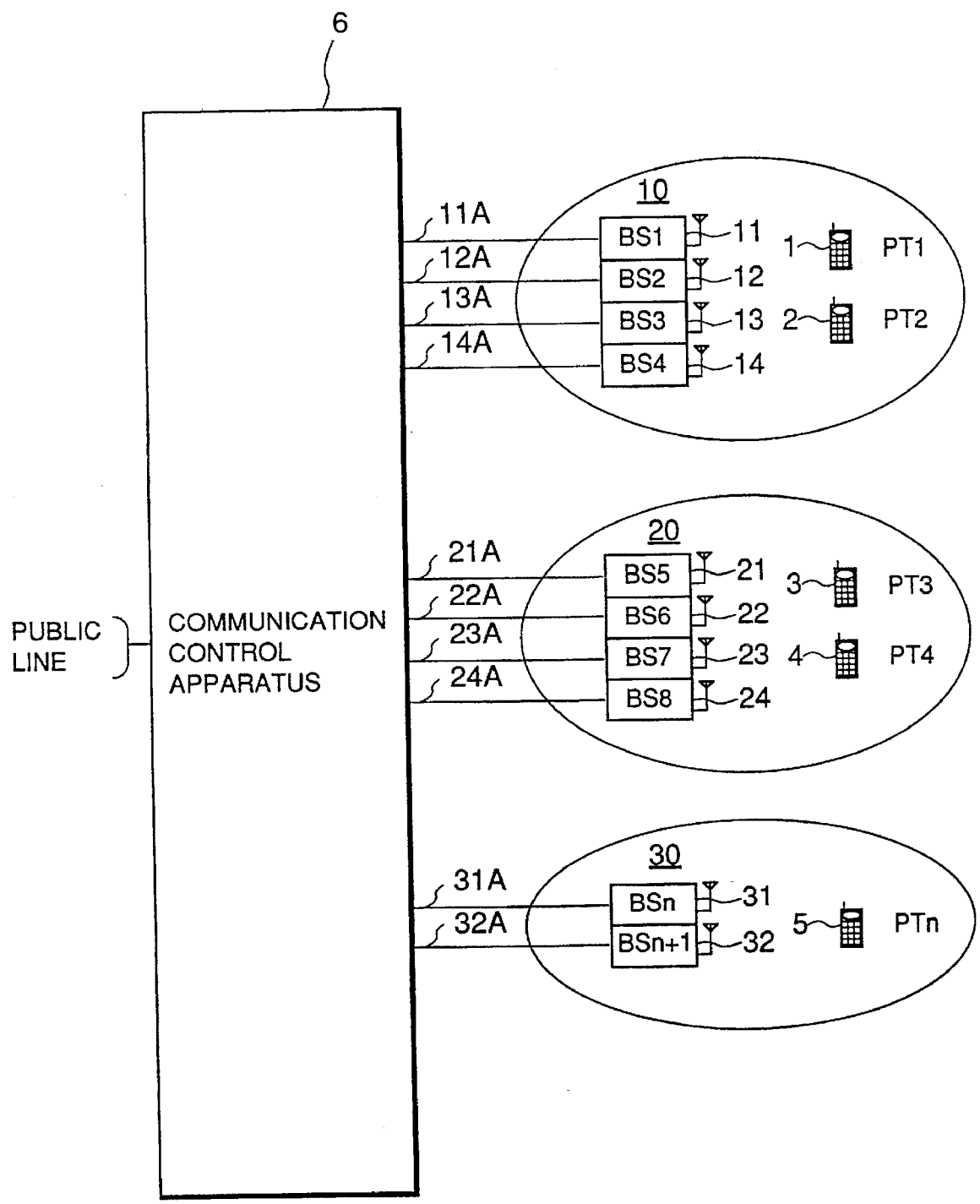
FIG. 15 is a block diagram showing a system construction in the sixth embodiment of the invention.

Further, by avoiding the speech communication channel such that it exerts an influence on the control channel if such a speech communication channel is used, a situation such that noises are given to the control channel and the carrier cannot be sensed can be prevented. FIG. 15 is a block diagram showing a construction of a radio communication system using a small power cordless telephone in the sixth embodiment of the invention.

As shown in the diagram, the radio communication system of the embodiment has: radio terminals 1 to 5; a communication control apparatus 6; a radio base station group 10 comprising radio base stations 11 to 14; a radio base station group 20 comprising radio base stations 21 to 24; and a radio base station group 30 comprising radio base stations 31 and 32.

Figure 16:
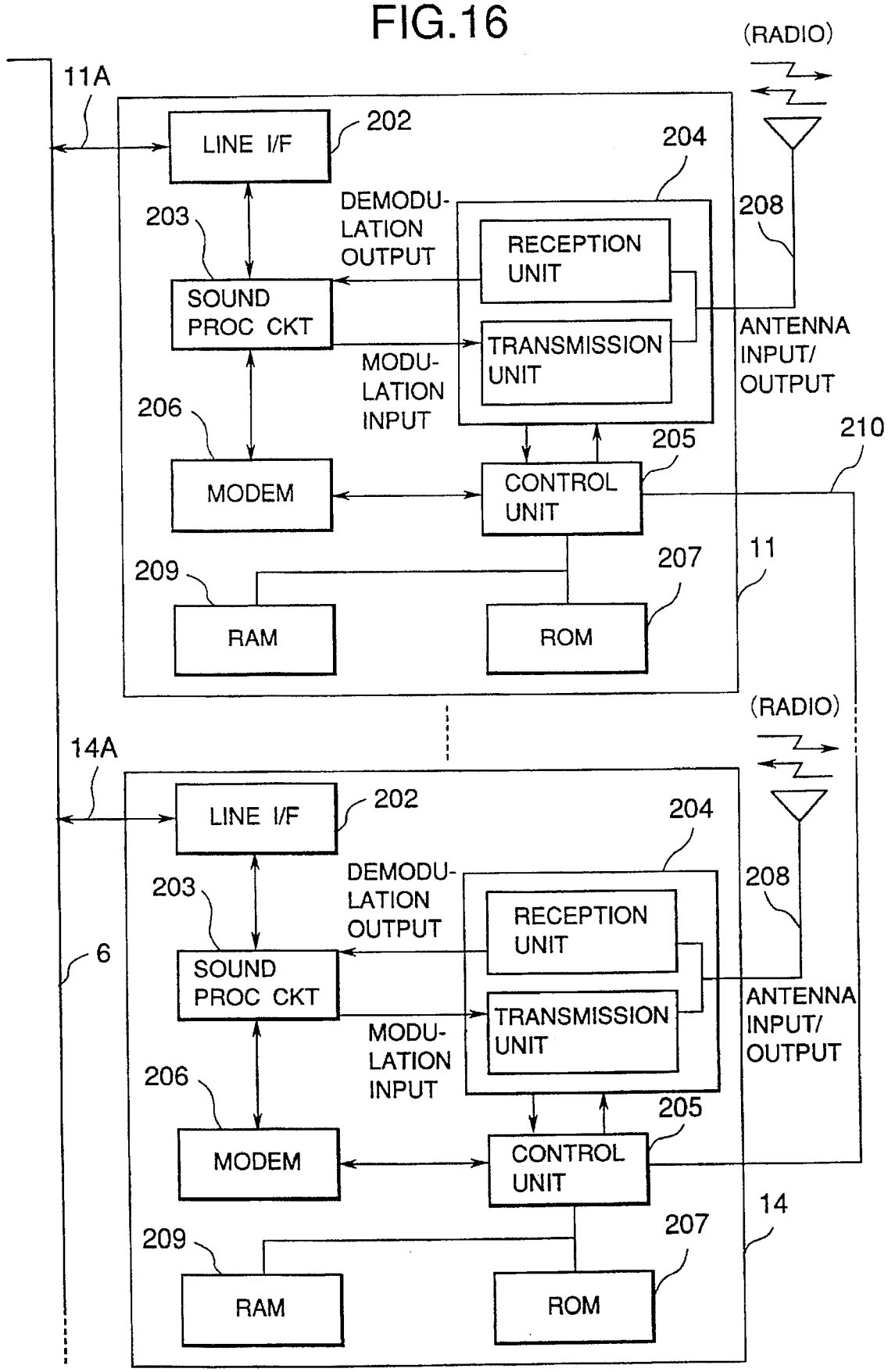
FIG. 16 is a block diagram showing a construction of a radio base station in the sixth embodiment.

FIG. 16 shows a construction of the radio base station of the embodiment. The radio base station in the embodiment has a connection line 210 to communicate with another radio base station in the same radio base station group in addition to the construction of FIG. 2. The communication control apparatus 6 and radio terminal PT in the embodiment have constructions which are common to those shown in FIGS. 1 and 3.

Figure 17:
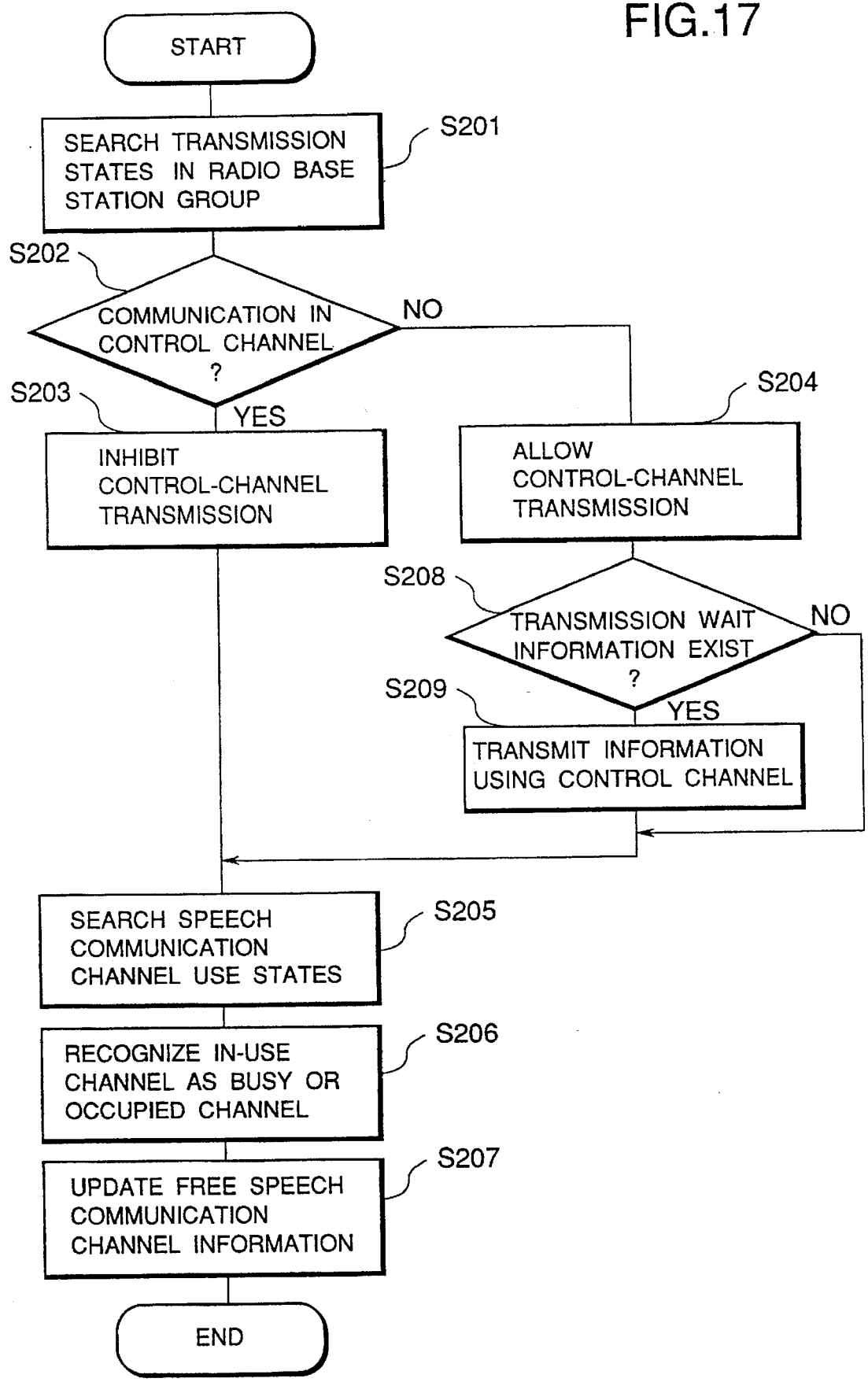
FIG. 17 is a flowchart showing the operation of the radio base station in the sixth embodiment.

FIG. 17 is a flowchart showing a radio channel control in the embodiment.

The radio base stations constructing the radio base station group search the transmission states in the radio base station group to which the self stations belong through the mutual physical connection point 210 of each of the radio base stations in the same radio base station group or through the communication control apparatus 6 and wire communication paths 11A to 14A or the like (S201).

A check is made to see if the radio base stations other than the self station are transmitting the radio wave by the control channel or not (S202). If YES, the transmission of the radio wave by the control channel is inhibited (S203). If NO in step S202, the transmission by the control channel is permitted (S204). If the relevant radio base station holds the information to be transmitted by the control channel (S208), the transmission is started by using the control channel (S209).

The information of the speech communication channel which is being used by the radio base station group is searched through the mutual physical connection point 210 of each of the radio base stations in the same radio base station group or through the communication control apparatus 6 and wire communication paths (S205). The in-use speech communication channel is recognized as a busy speech communication channel (S206) and is excluded from the targets as free speech communication channels and the free speech communication channel information is updated. By the above operations, until the free state of the relevant speech communication channel is confirmed by the searching operation (S205) after that, such an in-use speech communication channel is excluded from the search targets of the free speech communication channel (S207).

As mentioned above, the transmission situation in the radio base station group is searched through the mutual physical connection point 210 of each base station or through the communication control apparatus 6 and wire communication paths and the transmission situation of each radio base station is mutually grasped, so that the collision of the transmission signals on the control channel in the radio base station group can be prevented and the free speech communication channel information in the radio base station group can be efficiently searched.

The above embodiments have been described with respect to the system cordless telephone using the small power analog cordless telephone system as a radio communication system of the multichannel access method as an example. However, in addition to the above system, the invention can be also applied to other radio communication systems of the multichannel access method having the control channel such as digital cordless telephone system, car telephone system, portable telephone system, specific small power data communication system, and the like.

As described above, each radio base station constructing the radio base station group mutually recognizes the transmission situation of the radio wave of the individual radio base station through the mutual physical connection point or through the communication control apparatus and wire communication paths, thereby recognizing the in-use state of the control channel in the relevant radio base station group and preventing the transmission of the control signal in such a control channel. Therefore, the collision of the signals on the control channel can be avoided.

When each radio base station constructing the radio base station group is executing the radio communication by the speech communication channel, the other radio base stations constructing the relevant radio base station group recognize that the relevant speech communication channel is being used, so that the selected speech communication channel can be optimized.

By communicating by the base stations through the connection line 210, a load of the communication control apparatus can be reduced.

Although the present invention has been described on the basis of the preferred embodiments, the invention is not limited to the foregoing embodiments but many modifications and variations are possible within the spirit and scope of the appended claims of the invention.

What is claimed is:

1. A communication apparatus including a plurality of communicating means, which are connected with each other via an exchanging unit, for communicating in accordance with a multichannel access method, comprising:

receiving means for receiving ID information for identifying a first communication channel which is used by said plurality of communicating means;

selecting means for selecting a second communication channel other than the first communication channel such that it exerts an influence on a control channel if the second communication channel is used together with the first communication channel, in accordance with the ID information received by said receiving means; and discriminating means for discriminating whether or not the second communication channel selected by said selecting means is in a free state, in response to a communication request, wherein communication is performed by said plurality of communication means via the exchanging unit and the second communication channel which is discriminated as in the free state.

2. An apparatus according to claim 1, wherein said selecting means selects the second communication channel other than the first communication channel such that it exerts an influence on the control channel and the other communication channels if the second communication channel is used together with the first communication channel.

3. An apparatus according to claim 1, wherein when it is assumed that a frequency of the first communication channel is set to $f_A$, said selecting means selects the second communication channel other than the communication channel of a frequency $f_B$ such that $(2f_A-f_B)$ or $(2f_B-f_A)$ is equal to a frequency of a control channel.

4. An apparatus according to claim 2, wherein when it is assumed that a frequency of the first communication channel is set to $f_A$, said selecting means selects the second communication channel other than the communication channel of a frequency $f_B$ such that $(2f_A-f_B)$ or $(2f_B-f_A)$ is equal to a frequency of the other communication channel.

5. An apparatus according to claim 1, wherein said selecting means includes communicating means for communicating by the selected communication channel.

6. An apparatus according to claim 1, wherein said communication channel is a radio channel.

7. A communication apparatus, connected to an exchange unit, for communicating in accordance with a multichannel method, comprising:
   discriminating means for discriminating whether a signal exists on a communication channel of a frequency $f_A$ or not; and
   selecting means for selecting, in response to a communication request, a communication channel other than a communication channel of a frequency $f_B$ such that $(2f_A-f_B)$ or $(2f_B-f_A)$ is equal to a frequency of a control channel.

8. An apparatus according to claim 7, wherein said selecting means selects the communication channel other than the communication channel of the frequency $f_B$ such that $(2f_A-f_B)$ or $(2f_B-f_A)$ is equal to the frequency of the control channel and a frequency of a communication channel in a busy state.

9. A communication apparatus, connected to an exchange unit, for communicating in accordance with a multichannel method, comprising:
   discriminating means for discriminating whether a signal exists on a communication channel of a frequency $f_A$ or not; and
   selecting means for selecting, in response to a communication request, a communication channel other than a communication channel of a frequency $f_B$ such that $(2f_A-f_B)$ or $(f2_B-f_A)$ is equal to a frequency of a communication channel in a busy state.

10. A channel selecting method in a communication system including a plurality of communication units for communicating in accordance with a multichannel access method, which are connected with each other via an exchange unit, comprising the steps of:
    receiving identification data for identifying a first channel which is used by the plurality of communication units;
    selecting a second communication channel other than the first communication channel such that it does not interfere to a control channel of the multichannel access method when the first and second communication channels are used at a same time, in accordance with the identification data received in said receiving step; and
    discriminating whether or not the second communication channel selected in said selecting step is in a free state, in response to a communication request,
    wherein communication is performed via the exchanging unit and the second communication channel which is discriminated as in the free state.

11. A method according to claim 10, wherein the identification data is received via the exchange unit.

12. A method according to claim 10, wherein the identification data for identifying the first and third channels which are used by the plurality of communication units, is received in said receiving step, and the second communication channel is selected in said selecting step such that the second communication channel does not interfere to the control channel and the third communication channel when the first and second communication channels are used at the same time.

13. A method according to claim 10, wherein the identification information is received without using the exchange unit.

14. A method according to claim 10, wherein whether the second communication channel is in the free state is discriminated based on a radio signal in the second communication channel.

15. A communication apparatus connected with another communication apparatus via an exchange unit, comprising:
    receiving means for receiving, from said another communication apparatus, identification data for identifying a first communication channel which is used by said another communication apparatus;
    selecting means for selecting a second communication channel other than the first communication channel in accordance with the identification data received by said receiving means; and
    discriminating means for discriminating whether or not the second communication channel selected by said selecting means is in a free state, in response to a communication request,
    wherein communication is performed via the exchange unit and the second communication channel which is discriminated as in the free state.

16. An apparatus according to claim 15, wherein said receiving means receives the identification data via the exchange unit.

17. An apparatus according to claim 15, wherein said selecting means selects the second communication channel such that it does not interfere to a control channel of a multichannel access method when the first and second communication channels are used at a same time.

18. An apparatus according to claim 15, wherein said receiving means receives the identification data for identifying the first and third communication channels which are used by other communication apparatuses, and
    said selecting means selects the second communication channel such that it does not interfere to the third communication channel when the first and second communication channels are used at a same time.

19. An apparatus according to claim 15, wherein said receiving means receives the identification information without using the exchange unit.

20. An apparatus according to claim 15, wherein said discriminating means discriminates whether the second communication channel is in the free state based on a radio signal in the second communication channel.

21. A communication apparatus including a plurality of communicating means, which are connected with each other via an exchanging unit, for communicating in accordance with a multichannel access method, comprising:
    receiving means for receiving ID information for identifying a first communication channel which is used by said plurality of communication means;
    selecting means for selecting a second communication channel other than the first communication channel such that it exerts an influence on the other communication channels if the second communication channel is used together with the first communication channel, in accordance with the ID information received by said receiving means; and discriminating means for discriminating whether or not the second communication channel selected by said selecting means is in a free state, in response to a communication request, wherein communication is performed by said plurality of communicating means via the exchanging unit and the second communication channel which is discriminated as in the free state.

22. An apparatus according to claim 21, wherein when it is assumed that a frequency of the first communication channel is set to $f_A$, said selecting means selects the second communication channel other than the communication channel of a frequency $f_B$ such that $(2f_A-f_B)$ or $(2f_B-f_A)$ is equal to a frequency of the other communication channel.

23. An apparatus according to claim 21, wherein said selecting means includes communicating means for communicating by the selected communication channel.

24. An apparatus according to claim 21, wherein said communication channel is a radio channel.

25. A channel selecting method in a communication system including a plurality of communication units for communicating in accordance with a multichannel access method, which are connected with each other via an exchange unit, comprising the steps of:

receiving identification data for identifying first and third channels which are used by the plurality of communication units;

selecting a second communication channel other than the first communication channel such that the second communication channel does not interfere to the third communication channel when the first and second communication channels are used at a same time, in accordance with the identification data received in said receiving step; and discriminating whether or not the second communication channel selected in said selecting step is in a free state, in response to a communication request, wherein communication is performed via the exchanging unit and the second communication channel which is discriminated as in the free state.

26. A method according to claim 25, wherein the identification data is received via the exchange unit.

27. A method according to claim 25, wherein the identification information is received without using the exchange unit.

28. A method according to claim 25, wherein whether the second communication channel is in the free state is discriminated based on a radio signal in the second communication channel.

* * * * *